United States Patent
Hara et al.

(10) Patent No.: US 11,727,696 B2
(45) Date of Patent: Aug. 15, 2023

(54) NUMBER PLATE INFORMATION SPECIFYING DEVICE, BILLING SYSTEM, NUMBER PLATE INFORMATION SPECIFYING METHOD, AND PROGRAM

(71) Applicant: MITSUBISHI HEAVY INDUSTRIES MACHINERY SYSTEMS, LTD., Kobe (JP)

(72) Inventors: Kenta Hara, Tokyo (JP); Rie Hasegawa, Tokyo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 0 days.

(21) Appl. No.: 17/627,200

(22) PCT Filed: Jul. 19, 2019

(86) PCT No.: PCT/JP2019/028481
§ 371 (c)(1),
(2) Date: Jan. 14, 2022

(87) PCT Pub. No.: WO2021/014498
PCT Pub. Date: Jan. 28, 2021

(65) Prior Publication Data
US 2022/0262140 A1    Aug. 18, 2022

(51) Int. Cl.
*G06V 20/62* (2022.01)
*G06V 30/19* (2022.01)
*G06V 30/18* (2022.01)

(52) U.S. Cl.
CPC ...... *G06V 20/625* (2022.01); *G06V 30/18019* (2022.01); *G06V 30/1916* (2022.01);
(Continued)

(58) Field of Classification Search
CPC ............ G06V 20/625; G06V 30/9147; G06V 30/18019; G06V 30/19133; G06V 30/19093; G06V 30/1916; G06Q 2240/00
See application file for complete search history.

(56) References Cited

U.S. PATENT DOCUMENTS 8,509,571 B2 * 8/2013 Takenouchi ............ G06T 7/248
382/105
8,577,088 B2 * 11/2013 Hofman ................. G06V 20/63
382/104

(Continued)

FOREIGN PATENT DOCUMENTS

JP    2002-222726 A    8/2002

OTHER PUBLICATIONS

PCT/ISA/210, "International Search Report for PCT International Application No. PCT/JP2019/028481," dated Sep. 17, 2019.
(Continued)

*Primary Examiner* — Gregory M Desire
(74) *Attorney, Agent, or Firm* — Manabu Kanesaka; Benjamin Hauptman; Kenneth Berner

(57) ABSTRACT

A number plate information specifying device includes an image acquisition unit that acquires a number plate image, a feature point extraction unit that extracts a feature point from the number plate image, a degree of similarity calculation unit that references a learning data set in which a plurality of feature points are recorded in association with a plurality of pieces of number plate information and calculates degrees of similarity for the feature points recorded in the learning data set that correspond to the feature point extracted from the number plate image, a vote value calculation unit that, on the basis of the degrees of similarity, calculates vote values for the pieces of number plate information recorded in the learning data set, and a specifying unit that specifies the piece of number plate information that
(Continued)

has the highest vote value as the number plate information displayed in the number plate image.

9 Claims, 8 Drawing Sheets

(52) U.S. Cl.
CPC .. *G06V 30/19093* (2022.01); *G06V 30/19133* (2022.01); *G06V 30/19147* (2022.01); *G06Q 2240/00* (2013.01)

(56) References Cited

U.S. PATENT DOCUMENTS

| | | | |
|---|---|---|---|
| 9,111,169 B2* | 8/2015 | Challa | G06V 10/811 |
| 9,594,971 B1* | 3/2017 | Wilbert | G06V 20/63 |
| 10,950,124 B2* | 3/2021 | Nijhuis | G06V 20/62 |
| 11,227,174 B1* | 1/2022 | Alves | G06F 16/51 |
| 2012/0155712 A1* | 6/2012 | Paul | G06F 18/00 |
| | | | 382/105 |
| 2015/0371109 A1* | 12/2015 | Vo | G06T 7/20 |
| | | | 382/104 |
| 2018/0268238 A1* | 9/2018 | Khan | G06V 10/751 |

OTHER PUBLICATIONS

PCT/ISA/237, "Written Opinion for PCT International Application No. PCT/JP/2019/028481," dated Sep. 17, 2019.

* cited by examiner

| OBJECT ID | FEATURE POINT |
|---|---|
| 00001 | 72 172 77 51 190 148 180 40 70 ... 230 2 |
| 00002 | 133 66 30 245 91 171 129 ... 204 163 |
| ... | ... |
| 00200 | 55 199 199 61 193 111 12 41 ... 150 104 |
| 00201 | 226 4 254 91 158 98 58 134 197 ... 103 160 |
| 00202 | 126 231 70 5 191 115 130 132 196 ... 81 95 |
| ... | ... |
| 00400 | 244 20 201 204 125 178 209 237 97 ... 149 234 |
| 00401 | 58 6 148 164 95 247 130 122 93 ... 85 248 |
| ... | ... |

DS2

| IMAGE FILE NAME | VEHICLE NUMBER | OBJECT ID (from) | OBJECT ID (to) |
|---|---|---|---|
| aaa.jpg | ABC123 | 00001 | 00200 |
| bbb.jpg | ABC123 | 00201 | 00400 |
| ccc.jpg | ABC123 | 00401 | 00600 |
| ... | ... | ... | ... |
| ppp.jpg | DEF456 | 02001 | 02200 |
| qqq.jpg | DEF456 | 02201 | 02400 |
| rrr.jpg | DEF456 | 02401 | 02600 |
| ... | ... | ... | ... |
| sss.jpg | GHI789 | 10001 | 10200 |
| ttt.jpg | GHI789 | 10201 | 10400 |
| uuu.jpg | GHI789 | 10401 | 10600 |
| ... | ... | ... | ... |

NUMBER PLATE INFORMATION SPECIFYING DEVICE, BILLING SYSTEM, NUMBER PLATE INFORMATION SPECIFYING METHOD, AND PROGRAM

RELATED APPLICATIONS

The present application is National Phase of International Application No. PCT/JP2019/028481 filed Jul. 19, 2019, the disclosure of which is hereby incorporated by reference herein in its entirety.

TECHNICAL FIELD

The present invention relates to a number plate information specifying device, a billing system, a number plate information specifying method, and a program.

BACKGROUND ART

At tollhouses on toll roads, there is a case where a toll collection system that collects a toll by exchanging information by wireless communication between an RFID reader device installed on a lane and an RFID tag attached to a vehicle running on the lane is used. Further, at the tollhouses as described above, there is a case where a number plate recognition device that automatically recognizes and acquires number plate information (a vehicle number or the like) of the running vehicle in order to find and specify an illegal vehicle to which an RFID tag is not attached is installed.

The number plate recognition device photographs the number plate attached to the vehicle body of the running vehicle and performs optical character recognition (OCR) processing. The number plate recognition device extracts number plate information as character string data from the photographed number plate by the OCR processing.

CITATION LIST

Patent Document

[Patent Document 1] Japanese Unexamined Patent Application Publication No. 2002-222726

SUMMARY OF INVENTION

Technical Subject

Since a number plate has scratches, dents, decorations, or the like, there is a case where the number plate information cannot be correctly recognized by the OCR processing. Further, there is also a case where it is permitted to use various typefaces (fonts) for a number plate, and there is also a case where a typeface that tends to fail in recognizing a character string by the OCR processing is used. Due to such circumstances, there is a case where the OCR processing is failed with respect to some of the number plates attached to the vehicles using the toll road.

An object of the present invention is to provide a number plate information specifying device, a billing system, a number plate information specifying method, and a program, in which it is possible to enhance the accuracy of automatic recognition of a number plate.

Subject to be Solved

According to a first aspect of the present invention, there is provided a number plate information specifying device (2) including: an image acquisition unit (200) that acquires a number plate image; a feature point extraction unit (202) that extracts a feature point of the number plate image; a similarity calculation unit (203) that refers to a learning data set (DS) in which a plurality of feature points and a plurality of pieces of number plate information are recorded in association with each other, and calculates similarity of each feature point recorded in the learning data set to the feature point extracted from the number plate image; a vote value calculation unit (204) that calculates a vote value that is obtained by aggregating the similarity of each feature point recorded in the learning data set for each number plate information recorded in the learning data set; and a specifying unit (205) that specifies number plate information having a highest vote value as number plate information that is displayed on the number plate image.

According to such a configuration, the number plate information specifying device can specify the number plate information corresponding to the number plate image, based on the result (vote value) obtained by aggregating the similarity between the feature points extracted from the number plate image. Here, since the feature point that is extracted from the number plate image is extracted to include not only a character string (number plate information) engraved on a number plate, but also scratches, dents, decorations, or features that appear in a special typeface of the number plate, correct number plate information can be specified even with respect to a deformed number plate or a free font number plate, which is difficult to perform the OCR processing.

Further, according to a second aspect of the present invention, the specifying unit receives input of number plate information that is shown on the number plate image from an operator in a case where the highest vote value is equal to or less than a predetermined threshold value.

In this way, in a case where it is assumed that the specifying accuracy of the number plate information based on the comparison of the feature points is low, the number plate information is specified based on the visual determination of the operator, instead of specifying the number plate information by the determination of only the number plate information specifying device. Therefore, it is possible to enhance the specifying accuracy of the number plate information.

Further, according to a third aspect of the present invention, in a case where the highest vote value is equal to or less than a predetermined threshold value, the specifying unit notifies an operator of the number plate information having the highest vote value and the number plate image, and receives, from the operator, input of information indicating the determination result as to whether or not the number plate information having the highest vote value is to be specified as the number plate information that is displayed on the number plate image.

In this manner, by giving notice of the candidates for the number plate information with a high vote value, it is possible to reduce the time and effort of the number plate information input processing by the operator.

Further, according to a fourth aspect of the present invention, the number plate information specifying device described above further includes a learning unit (206) that additionally records the number plate information specified based on the input from the operator and the feature point extracted from the number plate image in association with each other, in the learning data set.

In this way, the relationship between the acquired number plate image and the number plate information specified by the visual determination of the operator is accumulated in the learning data set with an operation of a toll road. Therefore, the specifying accuracy based on the comparison of the feature points can be improved during the operation.

Further, according to a fifth aspect of the present invention, there is provided a billing system (1) including: the number plate information specifying device described above; a reader device (32) that reads user identification information for identifying a user to be billed, from an information recording medium attached to a vehicle; and a number plate recognition device (30) that performs OCR processing on a number plate image acquired through a camera (33) and extracts number plate information from the number plate image.

In this way, in the billing system, when performing the billing processing by the reader device, it is possible to extract the number plate information, based on not only the number plate specifying processing by the number plate information specifying device but also a normal OCR processing.

Further, according to a sixth aspect of the present invention, the number plate recognition device transmits the number plate image to the number plate information specifying device in a case where the number plate information cannot be extracted from the number plate image, as a result of the OCR processing.

In this way, the number plate image from which the number plate information can be extracted by the OCR processing does not become a target of the number plate information specifying processing by the number plate information specifying device. Therefore, the processing load of the number plate information specifying device can be reduced.

Further, according to a seventh aspect of the present invention, the number plate recognition device transmits the number plate image to the number plate information specifying device in a case where first number plate information extracted from the number plate image by the OCR processing and second number plate information read from the information recording medium do not coincide with each other.

In this way, the number plate image in which the result of the OCR processing does not coincide with the number plate information recorded in the information recording medium also becomes a target of the number plate information specifying processing by the number plate information specifying device. Therefore, even with respect to a number plate image with a high probability that the OCR processing may be incorrect, correct number plate information can be obtained through the number plate information specifying device.

Further, according to an eighth aspect of the present invention, there is provided a number plate information specifying method including: a step of acquiring a number plate image; a step of extracting a feature point of the number plate image; a step of referring to a learning data set in which a plurality of feature points and a plurality of pieces of number plate information are recorded in association with each other, and calculating similarity of each feature point recorded in the learning data set to the feature point extracted from the number plate image; a step of calculating a vote value of each number plate information recorded in the learning data set, based on the similarity; and a step of specifying number plate information having a highest vote value as number plate information that is displayed on the number plate image.

Further, according to a ninth aspect of the present invention, there is provided a non-transitory computer-readable medium that stores a program that causes a computer of a number plate information specifying device to execute a step of acquiring a number plate image, a step of extracting a feature point of the number plate image, a step of referring to a learning data set in which a plurality of feature points and a plurality of pieces of number plate information are recorded in association with each other, and calculating similarity of each feature point recorded in the learning data set to the feature point extracted from the number plate image, a step of calculating a vote value of each number plate information recorded in the learning data set, based on the similarity, and a step of specifying number plate information having a highest vote value as number plate information that is displayed on the number plate image.

Advantageous Effects of Invention

According to the number plate information specifying device, the billing system, the number plate information specifying method, and the program described above, it is possible to enhance the accuracy of the automatic recognition of the number plate.

BRIEF DESCRIPTION OF DRAWINGS

FIG. 6 is a diagram showing a data structure of a learning data set according to the first embodiment.

DESCRIPTION OF EMBODIMENTS

First Embodiment

Hereinafter, a billing system according to a first embodiment will be described in detail with reference to FIGS. 1 to 8.

(Overall Configuration of Billing System)

Figure 1:
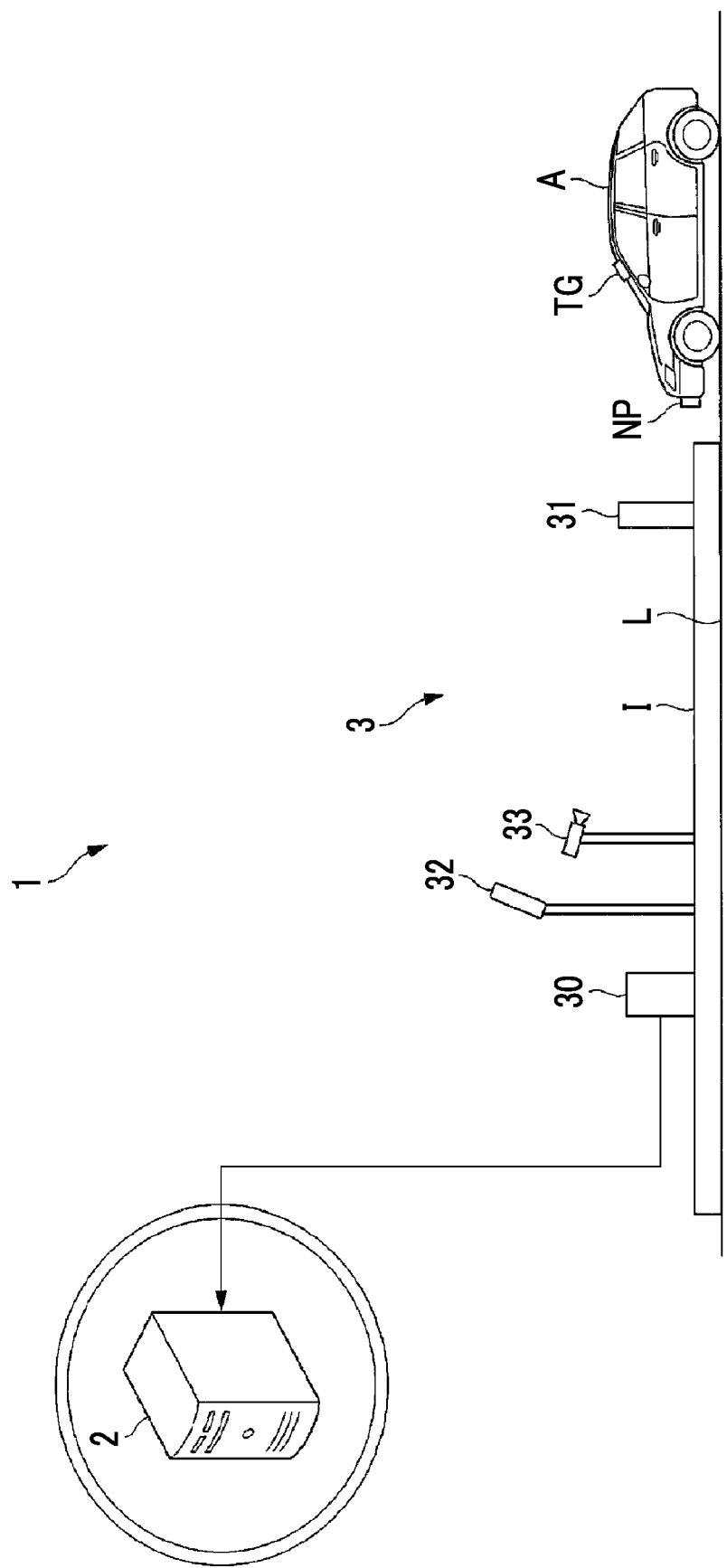
FIG. 1 is a diagram showing an overall configuration of a billing system according to a first embodiment.

FIG. 1 is a diagram showing the overall configuration of the billing system according to the first embodiment.

A billing system 1 shown in FIG. 1 is a system that is installed at a tollhouse on a toll road in order to collect usage fees from users who use the toll road.

As shown in FIG. 1, a roadside device 3 of the billing system 1 is installed on an island I laid on a roadside of a lane L of a tollhouse (an entrance tollhouse or an exit tollhouse) of a toll road. Further, a number plate information specifying device 2 is installed at a position away from the roadside device 3 and is communicably connected to the roadside device 3. Although not shown in the drawing, the number plate information specifying device 2 is also communicably connected to a plurality of roadside devices installed in other lanes and other tollhouses.

As shown in FIG. 1, the roadside device 3 of the billing system 1 includes a number plate recognition device 30, a vehicle detector 31, a reader device 32, and a camera 33.

The vehicle detector 31 is provided on the vehicle approach side of the lane L and detects the approach of a vehicle A into the lane L.

When the vehicle A enters the lane L (when a detection signal is received from the vehicle detector 31), the reader device 32 wirelessly communicates with a tag TG, which is an RFID tag (an information recording medium) attached to the vehicle A, and acquires information required for billing processing. Here, the information required for billing processing is user identification information (tag ID) for identifying a user to be billed. In the billing system 1, the user identification information read here is transmitted to a higher-level device for the billing processing, and billing is performed on the user.

As will be described later, in addition to the user identification information, number plate information (a vehicle number), a vehicle type classification (normal, large, or the like), and the like of the vehicle A are also recorded in the tag TG.

The camera 33 performs photographing when the vehicle A enters the lane L, and acquires an image that includes a number plate NP attached to the front of the vehicle body of the vehicle A. The image (hereinafter, also referred to as a "number plate image") acquired by the photographing by the camera 33 is immediately transmitted to the number plate recognition device 30.

The number plate recognition device 30 performs OCR processing on the number plate image acquired by the camera 33, and extracts number plate information from the number plate image. The number plate information is information on a character string composed of numbers and symbols written on the plate surface of the number plate, and is, for example, a classification number, a vehicle number (a serial designation number), or the like.

In a case where the number plate recognition device 30 fails in the OCR processing, the number plate recognition device 30 transmits the number plate image on which the OCR processing has been failed to the number plate information specifying device 2.

One aspect of a "case where the OCR processing is failed" is a case where no character string data can be extracted as a result of the OCR processing. In this case, the number plate recognition device 30 recognizes it as "OCR processing failure" in which the character string data could not be extracted from the number plate image.

Another aspect of a "case where the OCR processing is failed" is a case where the character string data is erroneously extracted by the OCR processing. In this case, the number plate recognition device 30 cannot recognize it as "failure" only by the extracted character string data. Therefore, the number plate recognition device 30 compares the number plate information (vehicle number) read from the tag TG through the reader device 32 with the number plate information extracted from the number plate image through the OCR processing. Then, in a case where the two pieces of number plate information do not coincide with each other, the number plate recognition device 30 considers that the OCR processing has been failed.

In a case where the number plate information can be extracted from the number plate image through the OCR processing and the extracted number plate information coincides with the number plate information read from the tag TG through the reader device 32, normal billing processing is performed. Therefore, in this case, the number plate recognition device 30 does not transmit the number plate image to the number plate information specifying device 2.

The number plate information specifying device 2 receives the number plate image on which the OCR processing has been failed in the roadside device 3 (the number plate recognition device 30). Then, the number plate information specifying device 2 specifies correct number plate information with respect to the number plate image, and returns the specifying result to the number plate recognition device 30. The specific function and processing flow of the number plate information specifying device 2 will be described later.

(Functional Configuration of Billing System)

Figure 2:
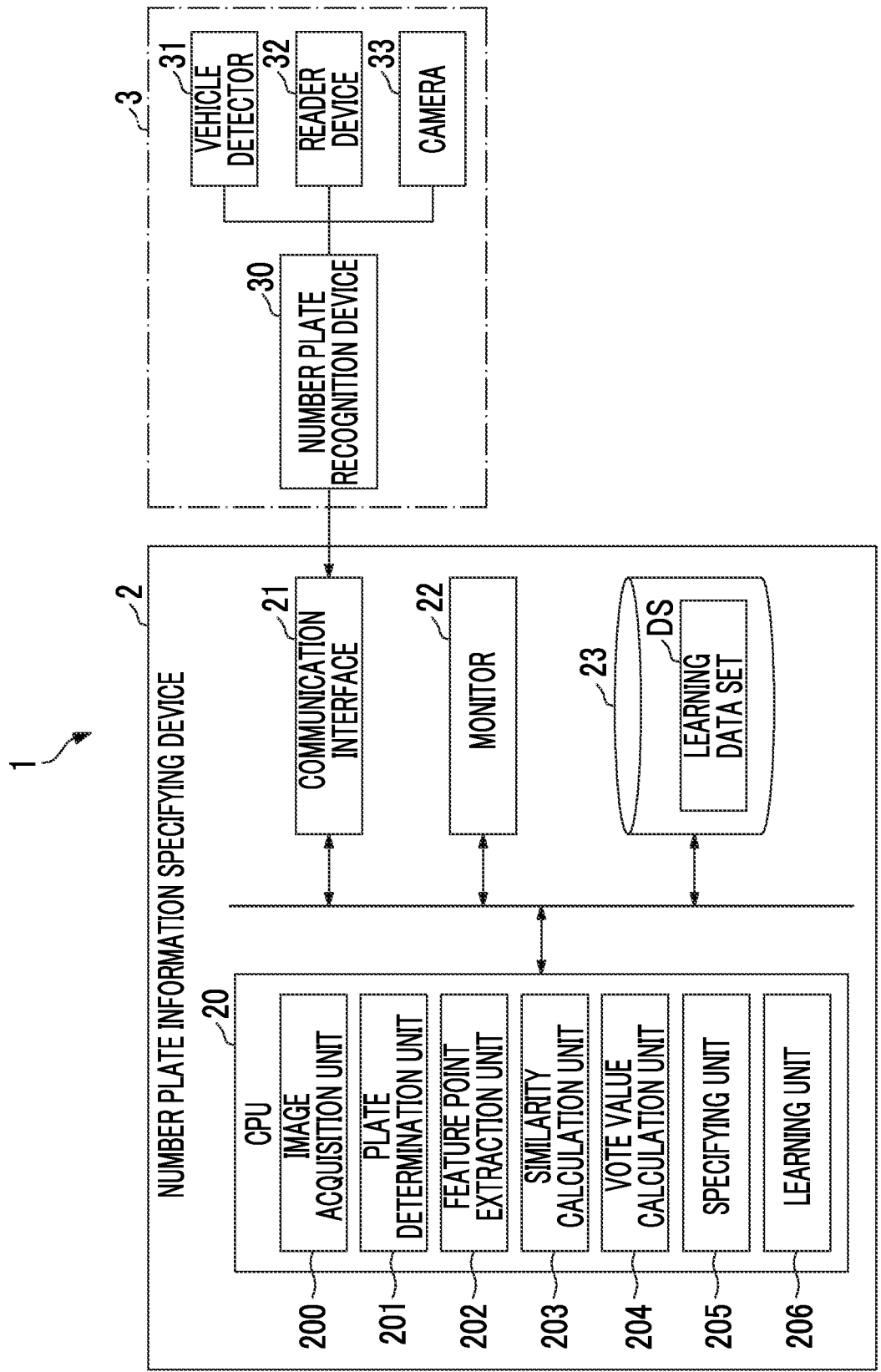
FIG. 2 is a diagram showing a functional configuration of the billing system according to the first embodiment.

FIG. 2 is a diagram showing a functional configuration of the billing system according to the first embodiment.

As shown in FIG. 2, the number plate information specifying device 2 includes a CPU 20, a communication interface 21, a monitor 22, and a recording medium 23.

The CPU 20 operates according to a program prepared in advance, thereby exerting various functions. The functions of the CPU 20 will be described later.

The communication interface 21 is a connection interface for communication with the roadside device 3 (the number plate recognition device 30).

The monitor 22 is a display device such as a liquid crystal display monitor.

The recording medium 23 is a so-called auxiliary storage device, and is a large-capacity recording device such as a hard disk drive (HDD) or a solid state drive (SSD). A learning data set DS that is used in order to specify the number plate information is recorded on the recording medium 23. In the learning data set DS, a plurality of feature points and a plurality of pieces of number plate information are recorded in association with each other. A specific data structure of the learning data set DS will be described later.

The functions of the CPU 20 will be described in detail. The CPU 20 has functions as an image acquisition unit 200, a plate determination unit 201, a feature point extraction unit 202, a similarity calculation unit 203, a vote value calculation unit 204, a specifying unit 205, and a learning unit 206.

The image acquisition unit 200 receives and acquires the number plate image from the number plate recognition device 30.

The plate determination unit 201 determines whether or not the number plate is photographed on the number plate image acquired by the image acquisition unit 200.

The feature point extraction unit 202 extracts feature points of the number plate image acquired by the image acquisition unit 200.

The similarity calculation unit 203 refers to the learning data set DS and calculates the similarity (Hamming distance) of each feature point recorded in the learning data set DS to the feature point extracted from the number plate image.

The vote value calculation unit 204 calculates a vote value that is obtained by aggregating the similarity of each feature point calculated by the similarity calculation unit 203 for each number plate information recorded in the learning data set DS. A specific aspect of the "vote value" will be described later.

The specifying unit 205 specifies the number plate information having the highest vote value calculated by the vote value calculation unit 204 as the number plate information that is displayed on the number plate image acquired by the image acquisition unit 200.

The learning unit 206 additionally records the number plate information specified based on the input from an operator of the number plate information specifying device 2 and the feature point extracted from the number plate image acquired by the image acquisition unit 200 in association with each other, in the learning data set.

(Processing Flow of Number Plate Recognition Device)

Figure 3:
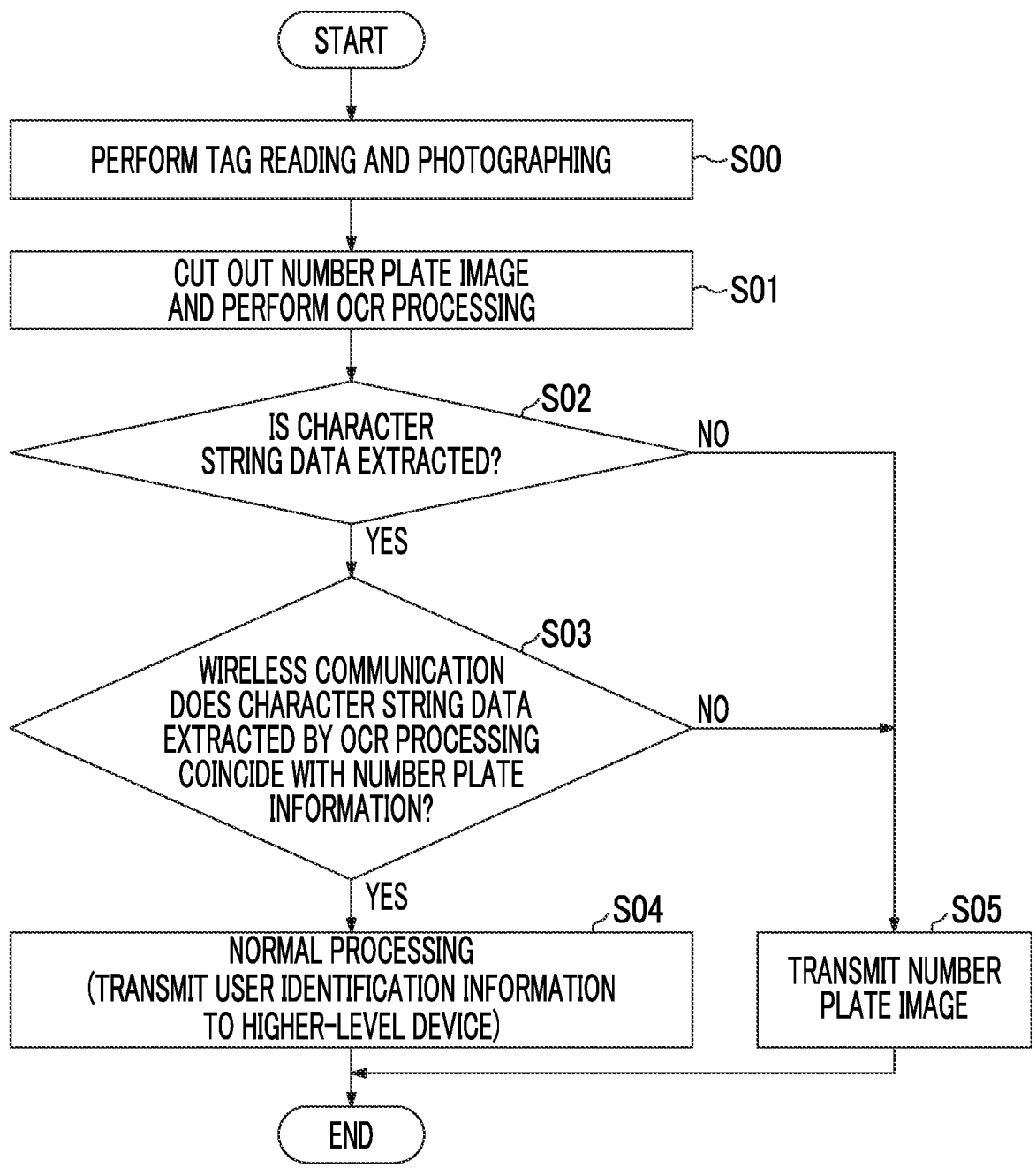
FIG. 3 is a diagram showing a processing flow of a number plate recognition device according to the first embodiment.

FIG. 3 is a diagram showing a processing flow of the number plate recognition device according to the first embodiment.

The processing flow shown in FIG. 3 is executed by the number plate recognition device 30 of the roadside device 3 in a case where the vehicle detector 31 detects the approach of the vehicle A (FIG. 1).

In a case where there is the approach of the vehicle A, the number plate recognition device 30 causes the reader device 32 to read the tag TG and the camera 33 to photograph the vehicle A (step S00).

Next, the number plate recognition device 30 cuts out a small region in which the number plate NP (FIG. 1) is photographed, from the entire image (an image in which the entire vehicle A is photographed) acquired by the camera 33, to generate a number plate image. The number plate recognition device 30 performs OCR processing on the generated number plate image (step S01).

Next, the number plate recognition device 30 determines whether or not the character string data can be extracted as a result of the OCR processing performed in step S01 (step S02).

In a case where the character string data can be extracted as a result of the OCR processing (step S02; YES), the number plate recognition device 30 then determines whether or not the character string data extracted by the OCR processing coincides with the number plate information (character string data) read from the tag TG (step S03).

In a case where the character string data extracted by the OCR processing coincides with the number plate information read from the tag TG (step S03; YES), the number plate recognition device 30 considers that the number plate information has been successfully acquired, and executes normal billing processing (transmission of user identification information) (step S04).

In a case where the character string data cannot be extracted as a result of the OCR processing (step S02; NO), or in a case where the character string data extracted by the OCR processing does not coincide with the number plate information read from the tag TG (step S03; NO), the number plate recognition device 30 transmits the number plate image generated in step S01 to the number plate information specifying device 2 (step S05).

(Processing Flow of Number Plate Information Specifying Device)

Figure 4:
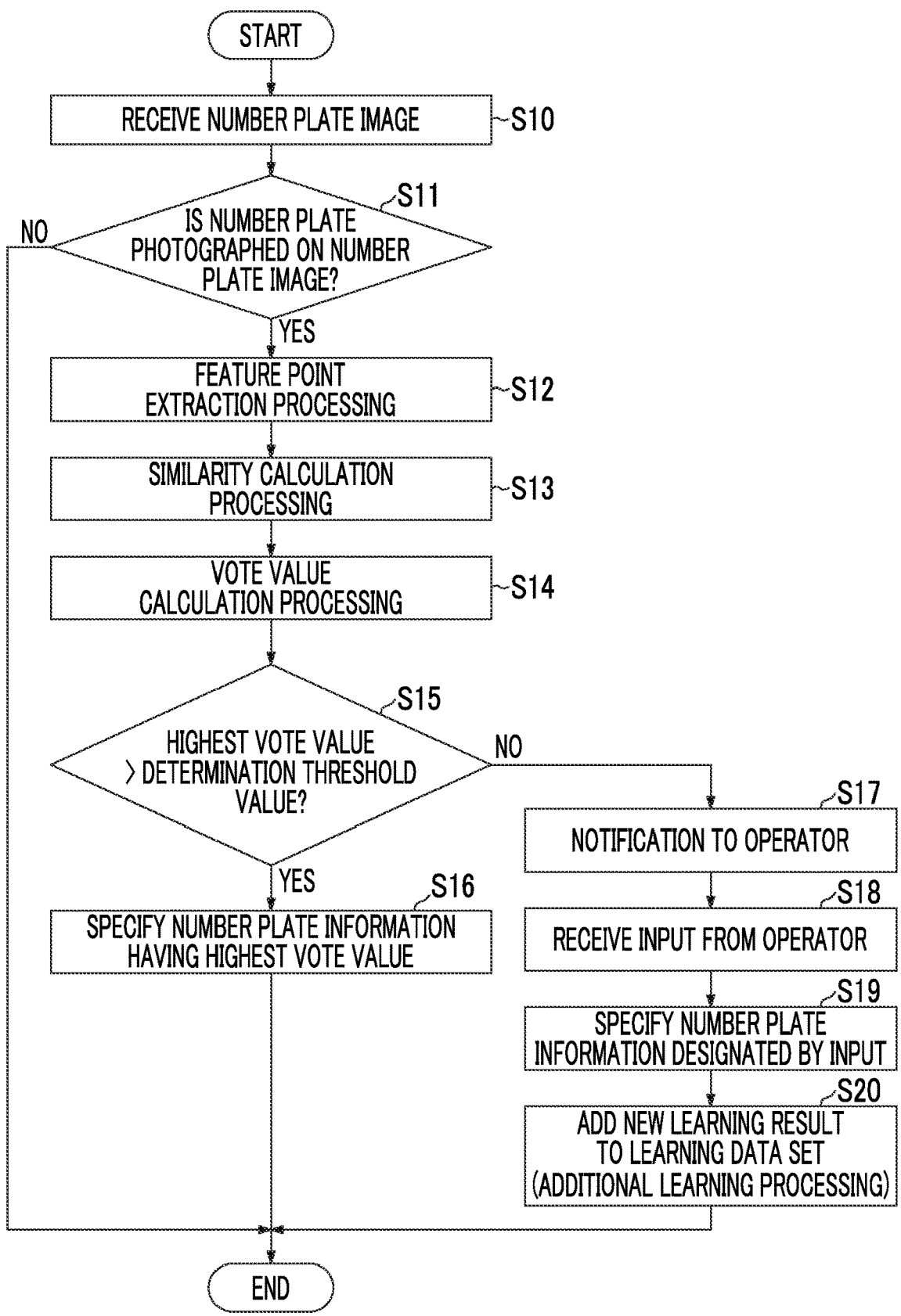
FIG. 4 is a diagram showing a processing flow of a number plate information specifying device according to the first embodiment.

FIG. 4 is a diagram showing a processing flow of the number plate information specifying device according to the first embodiment.

Figure 5:
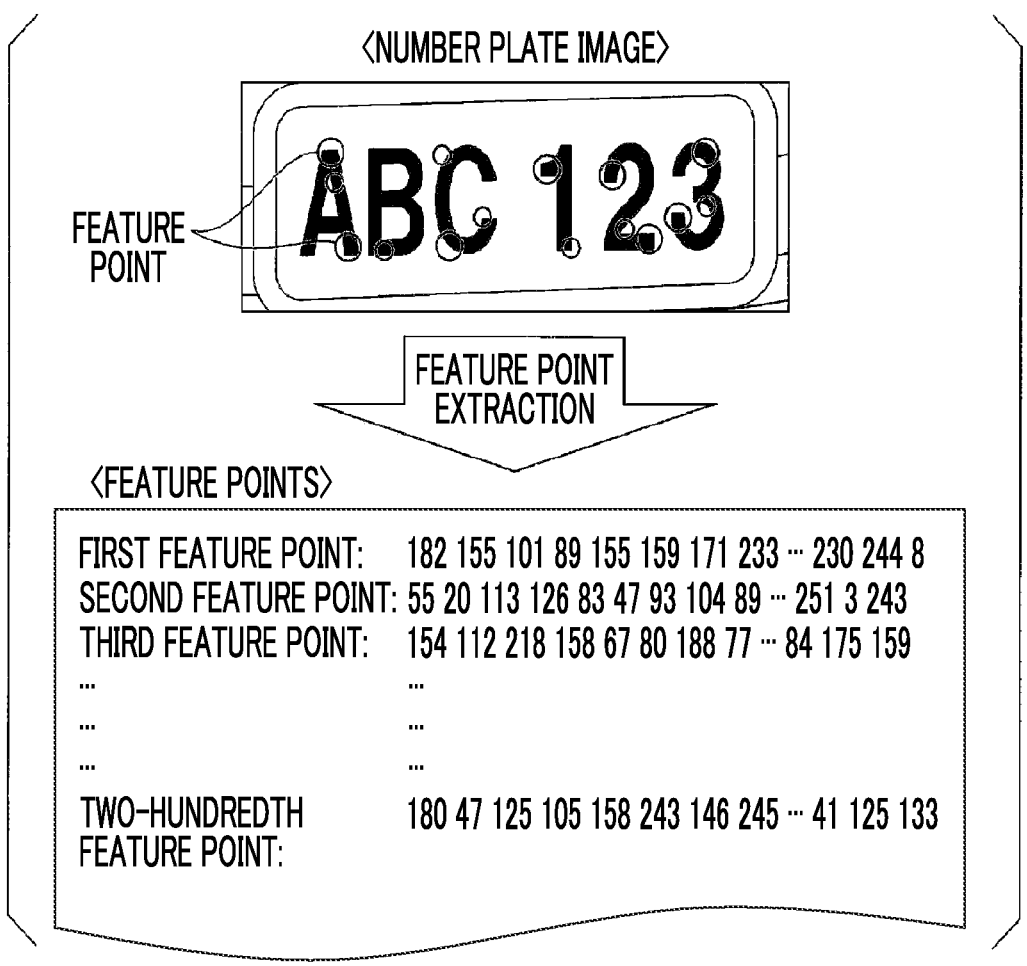
FIG. 5 is a diagram for explaining a specific content of the processing of the number plate information specifying device according to the first embodiment.
Figure 7:
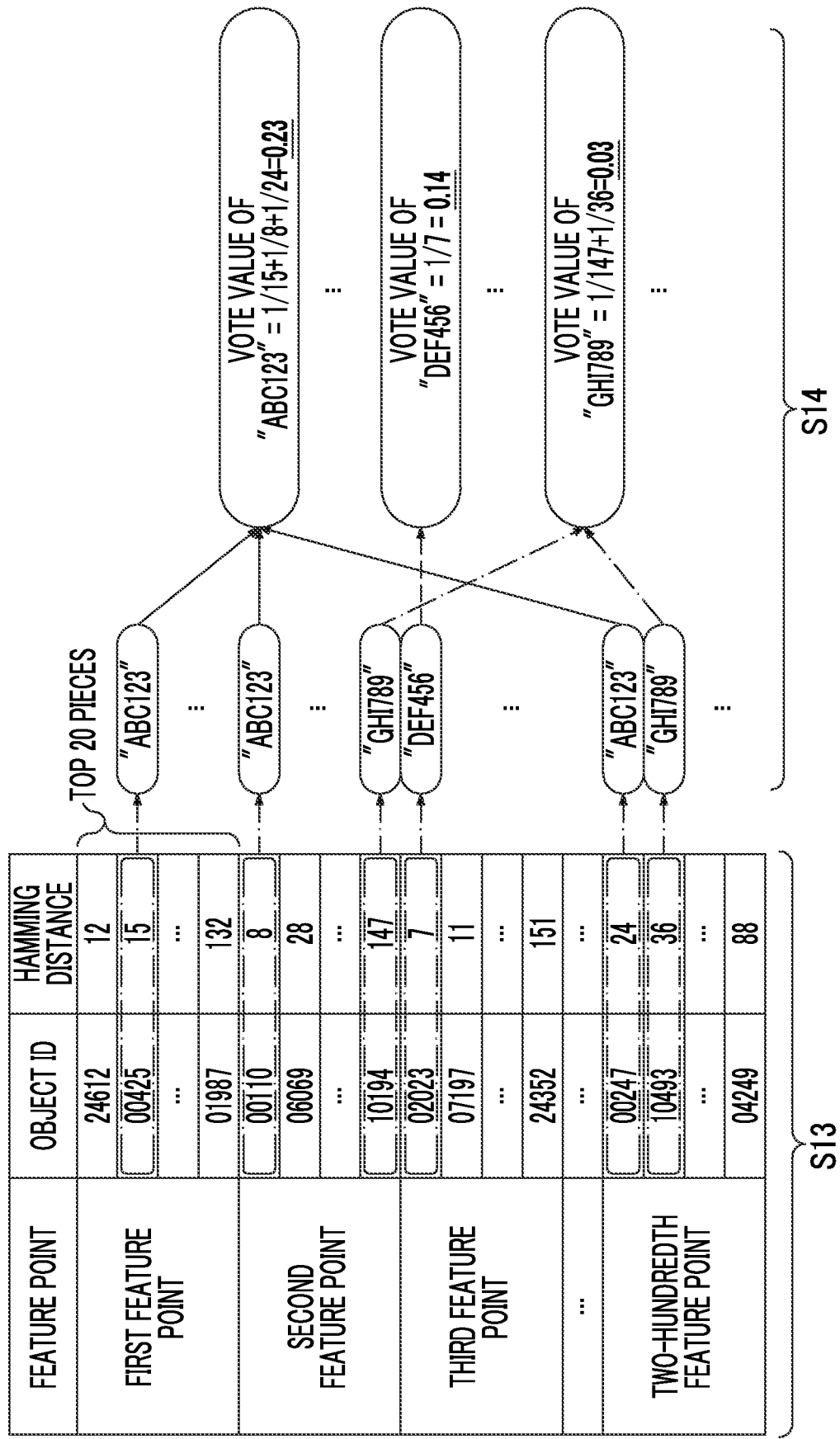
FIG. 7 is a diagram for explaining a specific content of the processing of the number plate information specifying device according to the first embodiment.

FIGS. 5 and 7 are diagrams for explaining specific contents of the processing of the number plate information specifying device according to the first embodiment.

FIG. 6 is a diagram showing a data structure of the learning data set according to the first embodiment.

Figure 8:
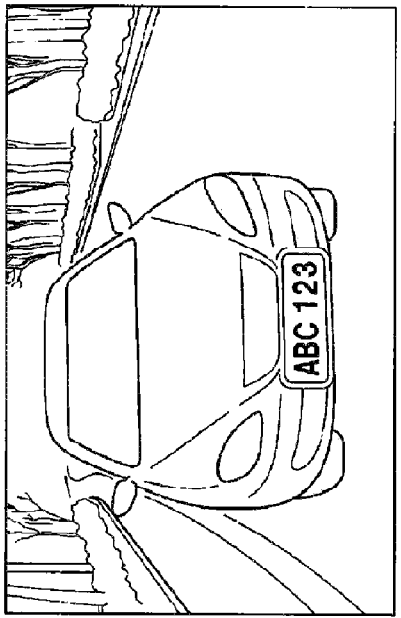
FIG. 8 is an example of an image that is displayed on a monitor of the number plate information specifying device according to the first embodiment.

FIG. 8 is an example of an image that is displayed on the monitor of the number plate information specifying device according to the first embodiment.

Hereinafter, the flow of the processing that is executed by the number plate information specifying device 2 according to the first embodiment will be described in detail with reference to FIGS. 4 to 8.

As shown in FIG. 4, first, the image acquisition unit 200 of the number plate information specifying device 2 receives and acquires the number plate image from the number plate recognition device 30 (step S10).

Next, the plate determination unit 201 of the number plate information specifying device 2 determines whether or not the number plate NP is photographed on the number plate image acquired in step S10 (step S11). Because there is a case where the number plate recognition device 30 fails in cutting out the region to which the number plate NP is photographed from the entire image and generates an image on which the number plate NP is not photographed, the above step is executed for the purpose of eliminating this.

In a case where the number plate NP is not photographed on the number plate image acquired in step S10 (step S11: NO), the plate determination unit 201 ends the processing flow on the received number plate image without performing any special processing. In this case, the number plate information specifying device 2 may return information indicating that the number plate NP is not photographed on the received number plate image to the number plate recognition device 30.

In a case where the number plate NP is photographed on the number plate image acquired in step S10 (step S11: YES), the feature point extraction unit 202 of the number plate information specifying device 2 then extracts feature points from the acquired number plate image (step S12).

Here, the feature point extraction processing in step S12 will be described with reference to FIG. 5.

The feature point extraction unit 202 extracts a plurality of feature points indicating the features of the image from the acquired number plate image. A place (point) where a feature as an image is conspicuous, for example, a shape of an edge, an end point of a curve, a point on a curve where the curvature is maximum, or the like in the number plate image is extracted as the feature point.

As shown in FIG. 5, one feature point is expressed by a multidimensional vector quantity (182, 155, 101, The feature point extraction unit 202 extracts, for example, about 200 feature points from one number plate image (step S12).

Next, the similarity calculation unit 203 of the number plate information specifying device 2 refers to the learning data set DS (FIG. 2), and calculates the similarity of each feature point recorded in the learning data set DS to the feature point extracted in step S12 (step S13).

Further, the vote value calculation unit 204 of the number plate information specifying device 2 calculates a vote value of each number plate information recorded in the learning data set DS, based on the similarity of each feature point calculated by the similarity calculation unit 203 (step S14). Here, the "vote value" is a value that is obtained by aggregating the similarity of each feature point recorded in the learning data set DS for each number plate information recorded in the learning data set DS. In the present embodiment, the "vote value" is the total value of the reciprocals of the Hamming distances.

Here, before explaining the processing of step S13 by the similarity calculation unit 203 and the processing of step S14 by the vote value calculation unit 204, the data structure of the learning data set DS will be described in detail with reference to FIG. 6.

As shown in FIG. 6, the learning data set DS recorded on the recording medium 23 has a data table DS1 showing the feature points accumulated so far and a data table DS2 in which a vehicle number associated with each feature point is recorded.

Specifically, in the data table DS1, an object ID and a vector quantity indicating a feature point are recorded in association with each other. The "object ID" is a serial number assigned to each feature point.

In the data table DS2, an image file name, a vehicle number, an object ID (from), and an object ID (to) are recorded in association with each other. The "image file name" is information for identifying the number plate image from which each feature point is extracted. The "vehicle number" is information on the number plate (vehicle number) photographed on the number plate image that is designated by the "image file name". The "vehicle number" recorded in the data table DS2 is determined based on the result of the visual determination of the number plate image by the operator, and can be treated as the true value of the number plate information that is displayed on the number plate image. The "object ID (from)," and the "object ID (to)" are information indicating a reference destination of the data table DS1, and indicate the feature points extracted from the number plate image that is designated by the "image file name".

For example, in the case of the example shown in FIG. 6, it is shown that 200 feature points that are designated by the object IDs "00001" to "00200" are extracted from the number plate image that is designated by "aaa.jpg". Similarly, it is shown that the feature points that are designated by the object IDs "00201" to "00400" and the feature points that are designated by the object IDs "00401" to "00600" are extracted from the number plate image that is designated by "bbb.jpg" and the number plate image that is designated by "ccc.jpg", respectively.

Further, all the three number plate images "aaa.jpg", "bbb.jpg", and "ccc.jpg" described above are number plate images in which the number plate information (vehicle number) of "ABC123" is photographed. Therefore, according to the learning data set DS shown in FIG. 6, all the feature points of the object IDs "00001" to "00600" are associated with the number plate information of "ABC123".

The number plate images "aaa.jpg", "bbbb.jpg", . . . , the number plate information (the true value of the vehicle number), and the feature points extracted from the number plate image are sequentially accumulated in the learning data set DS with the operation of a plurality of tollhouses provided on the toll road, by the processing of the learning unit 206 to be described later. That is, the number plate images that are received from a plurality of number plate recognition devices 30 installed at each tollhouse and each lane L on the toll road are accumulated in the learning data set DS.

Next, the processing of step S13 by the similarity calculation unit 203 and the processing of step S14 by the vote value calculation unit 204 will be described in detail with reference to FIG. 7.

In the processing of step S13, the similarity calculation unit 203 first calculates the Hamming distances between one (for example, the first feature point (FIG. 5)) of the plurality of feature points extracted from the number plate image and all the feature points recorded in the learning data set DS (the learning data table DS1). The Hamming distance indicates the distance between the feature amounts that are represented by multidimensional vector values, and it can be said that the smaller the Hamming distance is, the more similar it is. The similarity calculation unit 203 extracts a plurality (for example, the top 20 pieces) of feature points in which the Hamming distance is small, with respect to the first feature point (refer to FIG. 7 and step S13).

Also with respect to each of the other feature points (the second feature point, the third feature point, the two-hundredth feature point) extracted from the number plate image, similarly, the similarity calculation unit 203 extracts a plurality (for example, the top 20 pieces) of feature points in which the Hamming distance is small, from the learning data set DS (refer to FIG. 7 and step S13).

Next, the vote value calculation unit 204 calculates the vote value of each number plate information by using the feature point specified as a feature point having high similarity, with respect to each of the feature points (the first feature point, the second feature point, . . . , the two-hundredth feature point) extracted from the number plate image, and the Hamming distance thereof.

Specifically, the vote value calculation unit 204 extracts the feature point having the same number plate information as the number plate information associated with each feature point in the data table DS2, among the plurality of feature points specified in step S13. Then, the vote value calculation unit 204 integrates the reciprocal of the Hamming distance of each feature point associated with the same number plate information.

For example, according to the example shown in FIG. 7, among the plurality of feature points specified in step S13, the feature points associated with the number plate information (vehicle number) of "ABC123" are three object IDs "00425", "00110", and "00247". Therefore, the vote value calculation unit 204 calculates the sum of the reciprocals of the Hamming distances of the three feature points with respect to the number plate information of "ABC123". In this case, since the Hamming distance of the feature point that is indicated by the object ID "00425" is "15", the Hamming distance of the feature point that is indicated by the object ID "00110" is "8", and the Hamming distance of the feature point that is indicated by the object ID "00247" is "24", the vote value calculation unit 204 calculates the vote value of the number plate information of "ABC123" as $1/15+1/8+1/24=0.23$.

Similarly, according to the example shown in FIG. 7, the vote value calculation unit 204 calculates the vote value of the number plate information of "DEF456" as $1/7=0.14$ by using the Hamming distance "7" of the feature point of the object ID "02023". Further, the vote value calculation unit 204 calculates the vote value of the number plate information of "GHI789" as $1/147+1/36=0.03$ by using the Hamming distance "147" of the feature point of the object ID "10194" and the Hamming distance "36" of the feature point of the object ID "10493".

Next, the specifying unit 205 of the number plate information specifying device 2 specifies the number plate information (vehicle number) displayed in the number plate image received in step S10, based on the vote value of each number plate information calculated by the vote value calculation unit 204. In this processing, the specifying unit 205 first determines whether or not the highest vote value (maximum vote value) among the vote values calculated in step S14 exceeds a predetermined determination threshold value (step S15).

In a case where the highest vote value exceeds the determination threshold value (step S15; YES), it can be determined that the possibility that the number plate information with the highest vote value may be the number plate information that is displayed on the number plate image is high. Therefore, in this case, the specifying unit 205 immediately specifies the number plate information having the highest number plate information vote value as the number plate information displayed on the number plate image (step S16). In this case, the number plate information is automatically specified by the number plate information specifying device 2 without requiring an input operation by the operator.

On the other hand, in a case where the highest vote value is equal to or less than the determination threshold value (step S15; NO), it is determined that the number plate information with the highest vote value cannot be said to be the number plate information that is displayed on the number plate image. Therefore, the specifying unit 205 performs notification by displaying some pieces of number plate information (for example, the number plate information of the top three vote values) in which a high vote value is obtained, on the monitor 22 as candidates for the number plate information displayed on the number plate image (step S17).

Next, the specifying unit 205 receives input from the operator (step S18). The input from the operator is for designating one of the candidates displayed on the monitor 22, or is the number plate information designated by the direct input of the operator.

Next, the specifying unit 205 specifies the number plate information designated by the input of the operator as the number plate information displayed on the number plate image (step S19).

The processing in steps S17 to S19 described above will be described in detail with reference to FIG. 8.

FIG. 8 shows an example of a display screen D that is displayed on the monitor 22 of the number plate information specifying device 2 at the time of the approach of the vehicle A. As shown in FIG. 8, in the "target information" field of the display screen D, the entire image (camera image) of the approaching vehicle A and the number plate image cut out from the entire image are displayed. Further, in the "detailed information" field of the display screen D, in addition to information indicating the date, the time, the tollhouse, and the like when the approach of vehicle A is detected, the vehicle type classification and number plate information read from the tag TG, and the character string data (number plate information) recognized by the OCR processing are displayed. In the example shown in FIG. 8, since the character string data could not be recognized by the OCR processing, the "OCR" field is blank.

Further, as shown in FIG. 8, in the "candidate" field of the display screen D, three number plate information candidates having the higher vote value are displayed by the processing of step S17 by the specifying unit 205. The operator visually observes the number plate image displayed in the "target information" field, and performs an input operation of selecting and designating the correct character string data from the three number plate information candidates. The input operation by the operator may be a click operation using a mouse, a touch operation on a touch panel, or the like.

Further, in a case where there is no correct number plate information among the three number plate information candidates, or the like, the operator may directly input the visually confirmed correct number plate information to an input form provided in the "direct input" field.

Returning to FIG. 4, after the specifying unit 205 performs the processing of steps S17 to S19, the learning unit 206 of the number plate information specifying device 2 additionally records the number plate information designated by the input of the operator in step S18 and the feature point extracted from the number plate image received in step S10 in association with each other, in the learning data set DS (step S20). In this way, a new learning result is added to the learning data set DS.

(Operation and Effects)

As described above, the number plate information specifying device 2 according to the first embodiment includes the image acquisition unit 200 that acquires a number plate image, the feature point extraction unit 202 that extracts a feature point of the number plate image, the similarity calculation unit 203 that refers to the learning data set DS prepared in advance and calculates similarity of each feature point recorded in the learning data set DS to the feature point extracted from the number plate image, the vote value calculation unit 204 that calculates a vote value of each number plate information recorded in the learning data set DS, based on the similarity, and the specifying unit 205 that specifies the number plate information having the highest vote value as number plate information that is displayed on the number plate image.

According to such a configuration, the number plate information specifying device 2 can specify the number plate information corresponding to the number plate image by comparing the feature points extracted from the number plate image. Here, since the feature point that is extracted from the number plate image is extracted to include not only the character string (number plate information) engraved on the number plate, but also scratches, dents, decorations, or features that appear in a special typeface of the number plate, correct number plate information can be specified even with respect to a deformed number plate or a free font number plate, which is difficult to perform the OCR processing.

Further, according to the number plate information specifying device 2 of the first embodiment, the specifying unit 205 receives input (direct input to an input form) of the number plate information that is shown on the number plate image from the operator in a case where the highest vote value is equal to or less than a predetermined threshold value (refer to step S18 in FIG. 4, and FIG. 8).

In this way, in a case where it is assumed that the specifying accuracy of the number plate information based on the comparison of the feature points is low, the number plate information is specified based on the visual determination of the operator, instead of automatically specifying the number plate information. Therefore, it is possible to enhance the specifying accuracy of the number plate information.

Further, according to the number plate information specifying device 2 of the first embodiment, in a case where the highest vote value is equal to or less than a predetermined threshold value, the specifying unit 205 gives notice of (displays) the number plate information having the higher vote value and the number plate image acquired by the image acquisition unit 200 to the operator in a comparable manner (refer to FIG. 8). Then, the specifying unit 205 receives, from the operator, input of information indicating the determination result at to whether or not the number plate information having the highest vote value may be specified as the number plate information that is displayed on the number plate image (refer to step S18 in FIG. 4, and FIG. 8).

In this manner, by displaying the candidates for the number plate information with a high vote value in a selectable manner, it is possible to reduce the time and effort of the input processing of the operator.

Further, according to the number plate information specifying device 2 of the first embodiment, the number plate information specifying device 2 further includes the learning unit 206 that additionally records the number plate information specified based on the input from the operator and the feature point extracted from the number plate image in association with each other, in the learning data set DS.

In this way, the relationship between the number plate image in which the OCR processing has been failed and the number plate information specified by the visual determination of the operator are accumulated with the operation of the toll road. Therefore, the specifying accuracy based on the comparison of the feature points can be improved during the operation.

Further, according to the learning unit 206, only the number plate image visually determined by the operator due to the vote value being low (equal to or less than the determination threshold value) and the number plate information thereof are additionally recorded in the learning data set DS. That is, with respect to the pair of the number plate image and the number plate information for which a high vote value has been obtained, high specifying accuracy has been already obtained, and therefore, there is no great merit in learning any more. Therefore, as described above, it is possible to efficiently perform learning without increasing the amount of information of the learning data set DS too much.

For example, the number plate of a vehicle that uses the toll road for the first time is not learned at all in the number plate information specifying device 2. Therefore, in a case where the OCR processing on the number plate image of the vehicle is failed, the number plate information specifying device 2 tries to specify the number plate information from the existing learning data set DS. However, (because there is no matching information), any number plate information has a low vote value. In this case, the number plate image is visually determined by the operator (steps S17 to S18 in FIG. 4), and is additionally recorded in the learning data set DS in association with the correct number plate information. This is repeated every time the vehicle passes through the tollhouse on the toll road, whereby the learning results regarding the number plate of the vehicle are gradually accumulated, and the vote value also increases accordingly. Then, when the learning results are sufficiently accumulated and the vote value reaches a predetermined determination threshold value, the processing is switched to the automatic specifying processing (step S16 in FIG. 4), and the learning is completed (additional recording is not performed).

Further, the billing system 1 according to the first embodiment includes the number plate information specifying device 2, the number plate recognition device 30 that performs the OCR processing on the number plate image acquired through the camera 33 and extracts the number plate information from the number plate image, and the reader device 32 that reads user identification information for identifying a user to be billed from the tag TG (information recording medium) attached to the vehicle A.

In this way, in the billing system 1, when performing the billing processing by the reader device 32, it is possible to extract the number plate information, based on not only the number plate specifying processing by the number plate information specifying device 2 but also a normal OCR processing.

Further, the number plate recognition device 30 transmits the number plate image to the number plate information specifying device 2 in a case where the number plate information cannot be extracted from the number plate image acquired through the camera 33, as a result of the OCR processing (refer to step S02 in FIG. 3).

In this way, the number plate image from which the number plate information can be extracted by the OCR processing does not become a target of the number plate information specifying processing by the number plate information specifying device 2. Therefore, the processing load of the number plate information specifying device 2 can be reduced.

Further, the number plate recognition device 30 transmits the number plate image to the number plate information specifying device 2 in a case where first number plate information extracted from the number plate image by the OCR processing and second number plate information read from the tag TG do not coincide with each other (refer to step S03 in FIG. 3).

In this way, the number plate image in which the result of the OCR processing does not coincide with the number plate information recorded in the tag TG also becomes a target of the number plate information specifying processing by the number plate information specifying device 2. Therefore, even with respect to the number plate image with a high probability that the OCR processing may be incorrect, the correct number plate information can be obtained through the number plate information specifying device 2.

Modification Examples

The number plate information specifying device 2 according to the first embodiment and the billing system 1 provided with the number plate information specifying device 2 have been described in detail above. However, specific aspects of the number plate information specifying device 2 and the billing system 1 are not limited to those described above, and it is possible to add various design changes or the like to them within a scope that does not deviate from the gist.

For example, the number plate recognition device 30 according to the first embodiment has been described as the aspect in which it transmits only the number plate image in which the OCR processing has been failed to the number plate information specifying device 2. However, in other embodiments, there is no limitation to this aspect.

In the billing system 1 according to another embodiment, the number plate recognition device 30 may transmit all the number plate images including the number plate image whose OCR processing has been succeeded to the number plate information specifying device 2. In this way, it is possible to increase the learning speed for each number plate.

Further, the number plate information specifying device 2 according to the first embodiment has been described as the aspect in which it notifies the operator of three candidates having the higher vote value (displays the candidates on the monitor 22) in a case where the highest vote value becomes equal to or less than a predetermined determination threshold value. However, in other embodiments, there is no limitation to this aspect. For example, the number plate information specifying device 2 according to another embodiment may notify the operator of only one candidate having the highest vote value.

Further, the number plate information specifying device 2 (the vote value calculation unit 204) according to the first embodiment has been described as the aspect in which it calculates the vote value for each number plate information by the sum of the reciprocals of the Hamming distances. However, in other embodiments, there is no limitation to this aspect.

For example, the number plate information specifying device 2 according to another embodiment may determine the number of feature points whose Hamming distance is equal to or less than a predetermined value, among the feature points recorded in the learning data set DS, as the vote value for each number plate information. That is, the vote value calculation unit 204 calculates the vote value that is obtained by aggregating the determination result (similarity) of whether or not the Hamming distance is equal to or less than a predetermined value for each number plate information recorded in the learning data set DS.

Further, the number plate recognition device 30 according to the first embodiment has been described as the aspect in which it transmits the number plate image to the number plate information specifying device 2 in a case where the number plate information cannot be extracted by the OCR processing, and transmits the number plate image to the number plate information specifying device in a case where the number plate information (the first number plate information) does not coincide with the second number plate information read from the tag TG even in a case where the number plate information can be extracted by the OCR processing. However, in other embodiments, there is no limitation to this aspect.

For example, the number plate recognition device 30 according to another embodiment may specify provisional number plate information prepared in advance as the first number plate information in a case where the number plate information cannot be extracted by the OCR processing. This provisional number plate information is set as information (number) that is not actually used. In this way, in a case where the number plate information cannot be extracted by the OCR processing, the provisional number plate information prepared in advance and the number plate information read from the tag TG are compared with each other in step S03 in FIG. 3, and when the two do not coincide with each other, the number plate image is transmitted to the number plate information specifying device.

The provisional number plate information may be information set in the first number plate information in advance as an initial value before the number plate information extracted by the OCR processing is set.

The process of each processing in the number plate information specifying device 2 described above is stored in a computer-readable recording medium in the form of a program, and a computer reads and executes this program, whereby the processing is performed. Here, the computer-readable recording medium refers to a magnetic disk, a magneto-optical disk, a CD-ROM, a DVD-ROM, a semiconductor memory, or the like. Further, this computer program may be distributed to a computer by a communication line, and the computer receiving the distribution may execute the program.

Further, the above program may be a program for realizing some of the functions described above. Further, the program may be a so-called difference file (difference program) that can realize the functions described above in combination with a program already recorded in a computer system.

Further, the number plate information specifying device 2 may be configured with one computer or may be composed of a plurality of computers communicably connected to each other.

In addition, it is possible to appropriately replace the constituent elements in the embodiment described above with well-known constituent elements within a scope that does not depart from the gist of the present invention. Further, the technical scope of the present invention is not limited to the embodiment described above, and various modifications can be made within a scope that does not depart from the gist of the present invention.

INDUSTRIAL APPLICABILITY

According to the number plate information specifying device 2, the billing system 1, the number plate information specifying method, and the program described above, it is possible to enhance the accuracy of the automatic recognition of the number plate.

REFERENCE SIGNS LIST

1: billing system
2: number plate information specifying device
20: CPU
200: image acquisition unit
201: plate determination unit
202: feature point extraction unit
203: similarity calculation unit
204: vote value calculation unit
205: specifying unit
206: learning unit
21: communication interface
22: monitor
23: recording medium
3: roadside device
30: number plate recognition device
31: vehicle detector
32: reader device
33: camera
DS: learning data set
A: vehicle
NP: number plate
TG: tag

The invention claimed is:

1. A number plate information specifying device installed at a tollhouse, comprising:
   an image acquisition unit that acquires a number plate image;
   a feature point extraction unit that extracts a feature point of the number plate image;
   a similarity calculation unit that refers to a learning data set in which a plurality of feature points and a plurality of pieces of number plate information are recorded in association with each other, and calculates similarity of each feature point recorded in the learning data set to the feature point extracted from the number plate image;
   a vote value calculation unit that calculates a vote value that is obtained by aggregating the similarity of each feature point recorded in the learning data set for each number plate information recorded in the learning data set; and
   a specifying unit that specifies number plate information having a highest vote value as number plate information that is displayed on the number plate image,
   wherein the feature point includes at least one selected from the group consisting of a shape of an edge, an end point of a curve, and a point on a curve where a curvature is maximum in the number plate image.

2. The number plate information specifying device according to claim 1, wherein the specifying unit receives input of number plate information that is shown on the number plate image from an operator in a case where the highest vote value is equal to or less than a predetermined threshold value.

3. The number plate information specifying device according to claim 2, further comprising:
a learning unit that additionally records the number plate information specified based on the input from the operator and the feature point extracted from the number plate image in association with each other, in the learning data set.

4. The number plate information specifying device according to claim 1, wherein in a case where the highest vote value is equal to or less than a predetermined threshold value, the specifying unit notifies an operator of the number plate information having the highest vote value and the number plate image, and receives, from the operator, input of information indicating a determination result as to whether or not the number plate information having the highest vote value is to be specified as the number plate information that is displayed on the number plate image.

5. A billing system comprising:
the number plate information specifying device according to claim 1;
a reader device that reads user identification information for identifying a user to be billed, from an information recording medium attached to a vehicle; and
a number plate recognition device that performs OCR processing on a number plate image acquired through a camera and extracts number plate information from the number plate image.

6. The billing system according to claim 5, wherein the number plate recognition device transmits the number plate image to the number plate information specifying device in a case where the number plate information cannot be extracted from the number plate image, as a result of the OCR processing.

7. The billing system according to claim 5, wherein the number plate recognition device
transmits the number plate image to the number plate information specifying device in a case where first number plate information extracted from the number plate image by the OCR processing and second number plate information read from the information recording medium do not coincide with each other.

8. A number plate information specifying method for a tollhouse, comprising:
a step of acquiring a number plate image;
a step of extracting a feature point of the number plate image;
a step of referring to a learning data set in which a plurality of feature points and a plurality of pieces of number plate information are recorded in association with each other, and calculating similarity of each feature point recorded in the learning data set to the feature point extracted from the number plate image;
a step of calculating a vote value that is obtained by aggregating the similarity of each feature point recorded in the learning data set for each number plate information recorded in the learning data set; and
a step of specifying number plate information having a highest vote value as number plate information that is displayed on the number plate image,.
wherein the feature point includes at least one selected from the group consisting of a shape of an edge, an end point of a curve, and a point on a curve where a curvature is maximum in the number plate image.

9. A non-transitory computer-readable medium that stores a program that causes a computer of a number plate information specifying device installed at a tollhouse to execute:
a step of acquiring a number plate image;
a step of extracting a feature point of the number plate image;
a step of referring to a learning data set in which a plurality of feature points and a plurality of pieces of number plate information are recorded in association with each other, and calculating similarity of each feature point recorded in the learning data set to the feature point extracted from the number plate image;
a step of calculating a vote value that is obtained by aggregating the similarity of each feature point recorded in the learning data set for each number plate information recorded in the learning data set; and
a step of specifying number plate information having a highest vote value as number plate information that is displayed on the number plate image,
wherein the feature point includes at least one selected from the group consisting of a shape of an edge, an end point of a curve, and a point on a curve where a curvature is maximum in the number plate image.

* * * * *